United States Patent Office 3,679,425
Patented July 25, 1972

3,679,425
COAGULATION OF AQUEOUS POLYMERIC DISPERSIONS OF SILVER HALIDE
Kenneth Robert Hollister, Pittsford, and Ernest John Perry, Rochester, N.Y., assignors to Eastman Kodak Company, Rochester, N.Y.
No Drawing. Filed Aug. 3, 1970, Ser. No. 60,701
Int. Cl. G03c 1/04
U.S. Cl. 96—114
17 Claims

ABSTRACT OF THE DISCLOSURE

Processes are disclosed for coagulating and redispersing aqueous dispersions of polymeric compounds which contain anionic sulfoxy groups thereon. Generally, the polymeric dispersion is coagulated by adding a polymeric compound containing primary amine groups thereon and providing a dilution ratio of at least 100 grams of liquid per gram of polymer comprising anionic sulfoxy groups. The coagulated material can then be decanted and easily redispersed with low volumes of liquid.

---

This invention relates to a method of coagulating aqueous polymeric dispersions. In one aspect, this invention relates to a method of coagulating and redispersing an aqueous dispersion of a polymeric compound which contains anionic sulfoxy groups. In another aspect, this invention relates to a process of coagulating a silver halide emulsion which contains a polymeric silver halide peptizer having anionic sulfoxy groups appended thereto.

It is known in the prior art that dispersions of gelatin can be coagulated by using ammonium and metal salts in a salting-out procedure such as disclosed in U.S. Pats. 2,618,556, 2,768,079, 3,007,796 and 3,153,593. In the preparation of silver halide salts in the presence of a gelatin, which acts as a silver halide peptizer, the gelatinous dispersion can be coagulated by this salting-out procedure whereby the soluble salt by-products of the silver halide precipitation can be removed. Various synthetic polymeric materials have now been suggested as peptizers or for use in dispersions, especially as a replacement for gelatin in the preparation of silver halides. Methods of coagulating and redispersing these materials are desired to permit purification, washing and the like of the solid materials in said dispersion. Specifically, it is desirable to provide methods of coagulating and redispersing these synthetic polymeric materials which will not introduce inorganic metal contaminants and which will facilitate coagulation and redispersion without the need for extensive shredding of the coagulum or long periods of time to achieve redispersion.

We have now found that aqueous dispersions formed with a polymer which contains anionic sulfoxy groups thereon (i.e., such as groups containing sulfur and oxygen atoms, for example, sulfates, sulfonates and the like) can be readily coagulated when a polymeric compound containing primary amine groups thereon is added in small quantities to the dispersion and the liquid concentration is raised to provide a high dilution. Generally, when small quantities of a polymeric compound containing primary amines or primary amine salts are added to the dispersion, the dispersion can be coagulated by diluting the medium to provide at least 100 and preferably 150 grams of liquid, such as water, per gram of the polymer-containing anionic sulfoxy groups. The coagulum can then be readily decanted and can be returned to a dispersion simply by agitation in small quantities of the liquid carrier below the coagulating dilution concentration.

In a preferred embodiment, the primary amine compound is a poly(vinylamine).

In another preferred embodiment, this invention relates to an improved process for preparing a silver halide emulsion in the presence of a silver halide peptizer which is a polymeric compound having anionic sulfoxy groups thereon, the improvement comprising coagulating the emulsion by the addition of a polymeric compound containing primary amine groups thereon and providing a dilution ratio of at least 100 grams of liquid per gram of the polymeric compound having sulfoxy groups thereon.

In another preferred embodiment, this invention relates to the preparation of silver halide emulsions which are prepared in the presence of a silver halide peptizer consisting essentially of a synthetic polymeric compound.

In still another preferred embodiment, this invention relates to improved silver halide preparations in the presence of silver halide peptizers which are copolymers comprising (1) units containing sulfate or sulfonate groups thereon and (2) units having groups thereon containing sulfide-sulfur atoms linking two methylene groups.

Generally, the polymeric compounds containing primary amine groups, including the amine salts, which can be used in this invention include the polyvinylamines disclosed in U.S. Pat. 2,484,423; the linear polymeric amides disclosed in Formula II of U.S. Pat. 2,845,408 which contain primary amino groups in the side chains; polyacrylamides in which a portion of the amide groups have been converted to primary amino groups, such as those disclosed in U.S. Pat. 3,284,207; polymers of the polymerizable aminoalkyl acrylates disclosed in Formula I of U.S. Pat. 3,308,081; the acrylic acid-vinylamine copolymers disclosed in U.S. Pat. 3,415,653; the polyvinylamines prepared by the process disclosed in Belgian Pat. 540,976; the primary amines disclosed in Smith et al., U.S. Ser. No. 723,279, filed Apr. 22, 1968 now Pat. No. 3,637,394; and the like.

In one preferred embodiment of this invention, useful coagulating agents comprise primary amino group-containing homo- or co-polymers produced from ethylenically unsaturated monomers containing ω-primary amino groups having the formula:

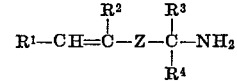

where $R^1$ is hydrogen or carboxyl; $R^2$ is hydrogen or methyl; each of $R^3$ and $R^4$ is an alkyl group of 1 to 12 carbon atoms, such as methyl, ethyl, propyl, butyl, pentyl, hexyl, 4-methylpentyl, heptyl, octyl, 5-ethylhexyl and the like; and Z is a divalent group containing at least one

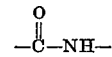

group and having the formula:

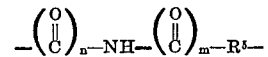

where each of n and m is 0 or 1, and n is 0 when m is 1, and m is 0 when n is 1, and $R^5$ is a divalent hydrocarbon group of from 1 to 20 carbon atoms, optionally having one or more hetero atoms contained therein or appended thereto and selected from the group consisting of alkylene of from 1 to 20 carbon atoms, such as methylene, ethylene, butylene, octylene, decylene, tetradecylene, octadecylene and eicosylene, oxoalkylene such as 2-aza-3-oxopentamethylene, cycloalkyene of 5 to 14 carbon atoms such as cyclopentylene, methylcyclopentylene, cyclohexylene, methylcyclohexylene, ethylcyclohexylene, butylcyclohexylene, cycloheptylene, methylcycloheptylene, propyl-cycloheptylene, and an alkylenecarbamoylphenylene group including

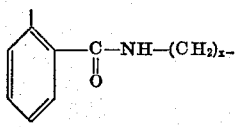

where $x$ is 1 to 20. Polymeric coagulants and the monomers employed in their preparation which have been described hereinabove are disclosed in Bowman, U.S. patent application Ser. No. 60,709, entitled "Addition Polymerizable Amine-Containing Vinyl Monomers and Polymers Thereof," filed Aug. 3, 1970 and which is incorporated herein by reference.

The polymeric organic primary amines can be added to the dispersion to obtain rapid coagulation in concentrations of from about 0.02 g. to about 20 g. and preferably from about 0.05 g. to about 5 g. per gram of the polymer-containing anionic sulfoxy groups. The optimum concentration for each dispersion will, of course, depend on factors such as concentration of primary amine groups in the particular polymeric compound chosen and the concentration of anionic sulfoxy compounds in the dispersed polymer.

Ethylenically unsaturated addition polymerizable monomers containing ω-amino groups that are useful in preparing polymeric coagulating agents of this invention include N - vinyl - N' - (2 - amino-2-methylpropyl)succinamide, N - (2 - amino - 2 - methylpropyl)methacrylamide, methacrylic acid salt, N-(2-amino-2-methylpropyl)maleamic acid, N - [1 - methyl - 4 - (1-amino-1-methylethyl)cyclohexyl]maleamic acid and the like. These compounds can be prepared by the process described in U.S. patent application Ser. No. 60,709, cited hereinabove, which process generally comprises reacting a non-aromatic, aliphatic α, ω-diamine in which one, and only one, of the primary amino groups is sterically hindered or made less nucleophilic by the attachment of substituents other than hydrogen to the carbon atom α to said primary amino group, with an ethylenically unsaturated carboxylic anhydride or an N-alkenyl dicarboximide at a temperature between 0° to about 45° C.

A highly preferred amine compound is prepared when the acid salt of the primary amino group-containing monomer is utilized to form the polymer, especially the acrylic acid salt or methacrylic acid salt of the primary amine-containing monomer. Such salts, as well as their free bases, are useful in the preparation of polymeric compounds of this invention, the acid salts generally providing polymers of higher molecular weight.

Homopolymers and copolymers of the above-described polymerizable primary amine-containing compounds are preferably employed in the practice of this invention. Useful addition polymerizable comonomers include acrylic acid, methacrylic acid and the like. Bulk, solution or emulsion polymerization techniques may be utilized in the preparation of the polymers useful in this invention. In certain preferred embodiments, solution polymerization procedures have been found especially useful.

In certain preferred embodiment, useful copolymers of this invention generally contain at least 20% by weight of repeating units having the structure:

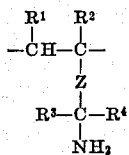

where $R^1$, $R^2$, $R^3$, $R^4$ and $Z$ are as previously given, and preferably 20% to 100% by weight of said units.

The dispersions which can be coagulated by the process of this invention are aqueous dispersions of a synthetic polymer which has anionic sulfoxy groups appended thereto. The polymers of this type can be water-soluble, but generally are classified as being at least water-dispersible such as to form somewhat stable aqueous dispersions. In certain preferred embodiments of this invention, the dispersed polymer is a copolymer which contains units having anionic sulfoxy groups appended thereto and units which are generally regarded as silver halide peptizing units. The peptizing unit can be any unit recognized as having silver halide peptizing properties when incorporated in a polymer, i.e., such as one which retards clumping of silver halide grains, aids in the orderly grain growth during silver halide precipitation, etc. Highly preferred peptizing units are those derived from monomers of amides and esters of ethylenically unsaturated acids, including maleic acids, acrylic acids, methacrylic acids and the like, in which the respective amine and alcohol condensation residues in said amides and esters contain at least one organic group having at least one sulfide sulfur atom linking two methylene groups ($-CH_2-$). Typical silver halide peptizing units useful in certain embodiments according to this invention are disclosed in U.S. Ser. No. 701,084, filed Jan. 29, 1968 now U.S. Pat. 3,615,624, which is incorporated herein by reference. These units can be obtained from monomers such as:

N-(3-thiabutyl)acrylamide
N-(3-thiapentyl)acrylamide
N-(4-methyl-2-thiapentyl)acrylamide
N-(2,5-dimethyl-4-thiahexyl)acrylamide
N-(5-thiaheptyl)acrylamide
N-(4-thiaheptyl)acrylamide
N-(6-methyl-4-thiaheptyl)acrylamide
N-(3-thiaoctyl)acrylamide
N-(7-thianonyl)acrylamide
N-(6-ethyl-2-methyl-4-thiaoctyl)acrylamide
N-(6-thia-2,4,9-trimethyldecyl)acrylamide
N-(4-thiadodecyl)acrylamide
3-thiapentyl acrylate
Bis(2-thiabutyl)methyl acrylate
Methylthioethyl acrylate
Methacryloylpyrolylmethionine methyl ester The dispersible polymers of this invention are preferably polymers containing sulfate or sulfonate groups appended thereto. Typical polymers of this type comprise monomers such as 3-acryloyloxypropane-1-sulfonic acid, sodium salt; 3-acryloyloxy-1-methylpropane sulfonic acid, sodium salt; sodium methacryloyloxyethyl sulfate; and the like. Generally, the dispersible polymers are copolymers comprising units having one anionic sulfoxy group thereon and units of at least one other ethylenically unsaturated monomer. Preferably, the copolymer contains (1) units containing the anionic sulfoxy group, (2) units of a silver halide peptizing monomer and (3) units of ethylenically unsaturated carboxylic acids such as acrylic acids and methacrylic acids; polymers of this type can be balanced to provide the desired degree of water-dispersibility, and in many cases pH sensitivity.

The process of this invention generally involves the preparation of an aqueous dispersion of polymer-containing anionic sulfoxy groups. The dispersion is coagulated by the addition of an aqueous solution of a primary amino group-containing polymer of this invention in the concentration previouly set forth. A quantity of water is added, raising the water concentration to at least 100 grams and preferably 150 grams per gram of the polymer-containing anionic sulfoxy groups to form a firmly coherent coagulum which precipitates from the liquid portion of the system. The liquid is removed without loss of coagulated material by any convenient procedure such as decantation or the like. Redispersion is readily and completely effected by agitating the coagulum with a sufficient volume of liquid to bring the over-all volume back to its original level. The liquid may comprise water or mixtures of water and an organic solvent.

Generally, about 0.02 g. to about 20 g. and preferably about 0.05 g. to 5 g. of the primary amine-containing polymer is added during the coagulation process per gram of the dispersed polymer-containing anionic sulfoxy groups. If the water level of the dispersion is above about 100 g. per gram of said dispersed polymer and preferably above 150 g., the dispersion will generally coagulate immediately. However, if it is not at this liquid level, sufficient water is added to dilute the solution to a point where it will coagulate. Likewise, when the polymer or solids are redispersed, the liquid concentration is limited to an amount below the coagulation level.

Heating at a moderate temperature not exceeding about 40° C. for several minutes may be employed during the step of coagulating the silver halide dispersion. The application of heat, however, is merely adjunctive and is not essential to carrying out the process of this invention.

The coagulation of the silver halide dispersion can be hastened in certain embodiments by reducing the pH of the system to about less than 5 to preferably about 3 after addition of the primary amine group-containing polymer. The resulting coagulum is separated from the liquid portion by decantation or the like and redispersion is effected by adding fresh liquid and raising the pH to its original value. However, if the pH is lowered too much, greater difficulties are encountered in redispersing the solids.

The process of this invention can generally be used for coagulating and redispersing any dispersable polymer which contains anionic sulfoxy groups. Water-soluble salts, catalysts used during the preparation, etc., can be readily removed by decanting the coagulum, thus providing an easy purification process. The process of this invention is also applicable wherein the dispersible polymer serves as a reaction aid, precipitation aid, vehicle or carrier for products formed in a given reaction, thus allowing one to segregate the solid material formed in the reaction from the liquid medium.

The process is, of course, especially useful in the preparation of silver halide salts wherein silver halide is precipitated in an aqueous dispersion of a peptizer. The resulting emulsion can be readily coagulated, decanted and redispersed without extensive mechanical procedures or the introduction of inorganic metal salts which can have a deleterious effect on the photographic properties of the silver halide. The polymers containing primary amine groups used in the coagulation process generally are not objectionable in photographic applications; in fact, many of the primary amines actually supplement the photographic properties by acting as development modifiers, antifoggants and the like.

The invention can be further illustrated by the following examples of preferred embodiments thereof.

EXAMPLE 1

Preparation of poly[N-(2-amino-2-methylpropyl) methacrylamide, methacrylic acid salt]

A solution of 23.2 g. of N-(2-amino-2-methylpropyl) methacrylamide, methacrylic acid salt, in 209 ml. of distilled water is purged with nitrogen for about 15 minutes, treated with a solution of 0.116 g. of 2,2′-azobis(2-methylpropionitrile) in a few ml. of acetone, and stirred at 60° C. for 5 hours. After cooling, the resulting dope has a solids content of 9.3 percent.

EXAMPLE 2

Preparation of poly[acrylic acid-co-N-vinyl-N′-(2-amino-2-methylpropyl)succinamide] (mole ratio 1:1)

A solution of 5.4 g. of acrylic acid and 16.05 g. of N-vinyl-N′-(2-amino-2-methylpropyl)succinamide in 86 ml. of distilled water is purged with nitrogen for about 10 minutes, treated with a solution of 0.11 g. of 2,2′-azobis-(2-methylpropionitrile) in a few ml. of acetone, and then stirred at 60° C. overnight. Upon cooling, the resulting dope has a solids content of 20 percent.

EXAMPLE 3

Preparation of poly(3-thiapentyl acrylate-co-acrylic acid-co-3-acryloyloxypropane-1-sulfonic acid, sodium salt) (mole ratio 1.0:1.7:5.2)

A mixture of 1200 g. of an aqueous solution containing 40.9 weight-percent of 3-acryloyloxypropane-1-sulfonic acid, sodium salt, and 4.0 weight-percent of acrylic acid, 68.8 g. (0.429 mole) of 3-thiapentyl acrylate, 1440 ml. of water and 660 ml. of ethanol is purged with nitrogen gas for about 10 minutes, then stirred at 80° C. under a nitrogen atmosphere for another 10 minutes. To the mixture is added 3.6 g. of 2,2′-azobis(2-methylpropionitrile) and stirring at 80° C. under nitrogen is continued for about 2 hours. After cooling and filtering through a stainless-steel strainer, the dope has a solids content of 22.3 percent.

EXAMPLE 4

Preparation of copoly(3-thiapentyl acrylate-co-3-acryloyloxy-1-methylpropane-1-sulfonic acid, sodium salt) (mole ratio 1:6)

A mixture of 25.0 g. of 3-acryloyloxy-1-methylpropane-1-sulfonic acid, sodium salt, 2.88 g. of 3-thiapentyl acrylate, 110 ml. of distilled water and 34 ml. of ethanol is purged with nitrogen for 10 minutes, treated with 0.18 g. of 2,2′-azobis(2-methylpropionitrile), stirred and heated at 80° C. for 2 hours and cooled to yield a dope containing 16.7 percent solids.

EXAMPLE 5

Preparation of copoly(3-thiapentyl acrylate—sodium methacryloyloxyethyl sulfate) (mole ratio 1:6)

A mixture of 3.2 g. of 3-thiapentyl acrylate, 25.0 g. of sodium methacryloyloxyethyl sulfate, 34 ml. of ethanol and 110 ml. of distilled water is purged with nitrogen for 10 minutes, treated with 0.18 g. of 2,2′-azobis(2-methylpropionitrile) and heated at 80° C. under a nitrogen atmosphere for about 2 hours. The resulting dope contains 17.1 percent solids.

EXAMPLE 6

Preparation of copoly[N-(3-thiabutyl)acrylamide-3-acryloyloxypropane-1-sulfonic acid, sodium salt] (mole ratio 1:3)

A mixture of 338.4 g. (3.60 moles) of sodium acrylate in 3808 ml. of redistilled dimethyl sulfoxide is stirred in a dry system under nitrogen as 439.7 g. (3.60 moles) of redistilled 1,3-propane sultone is rapidly added. The mixture is stirred and warmed until an exothermic reaction begins. When the exothermic reaction subsides, the mixture is heated to 50° C. a half hour. To the clear solution is added 174.0 g. (1.20 moles) of N-(3-thiabutyl)acrylamide and 4.76 g. of 2,2′-azobis(2-methylpropionitrile). The mixture is purged with nitrogen for 15 minutes, then allowed to stir under a nitrogen atmosphere overnight at 60° C. The product is precipitated by pouring into acetone, the solid collected, washed with acetone and dried under vacuum at room temperature. Yield—975.4 g.

EXAMPLE 7

A silver halide suspension is prepared in the following manner:

A beaker is charged with 65.6 g. of potassium bromide, 2.00 g. of potassium iodide, 600 ml. of water and 44.8 g. of a 22.3 percent aqueous solution of a copolymer of 3-thiapentyl acrylate, acrylic acid and 3-acryloyloxypropane-1-sulfonic acid, sodium salt (mole ratio 1.0:1.5:5.2), prepared as described in Example 3. The pH of the solution is adjusted to 6.4 with dilute aqueous sodium hydroxide and it is stirred continuously at 70° C. as a solution of 76.4 g. of silver nitrate in 400 ml. of distilled water is added at constant rate over 30 minutes. The suspension thus formed is then cooled to room temperature.

The silver halide suspension is coagulated and redispersed as follows:

A 100-g. sample of the above suspension is treated with 43 g. of a 9.3 percent aqueous solution of a polymer of N-(2-amino-2-methylpropyl)methacrylamide, methacrylic acid salt, prepared by the procedure described in Example 1. The suspension is stirred thoroughly and remains smoothly dispersed. It is then diluted with 107 ml. of distilled water and stirred an additional few minutes. The dispersion breaks with the formation and precipitation of a slightly sticky, somewhat rubbery material. The clear aqueous supernatant liquid is then conveniently decanted without loss of precipitate. Upon stirring the precipitate with enough water to bring the over-all volume back to its original level, it redisperses quickly and completely.

EXAMPLE 8

A silver halide suspension is prepared in the following manner:

A beaker is charged with a solution containing 8.0 g. of a copolymer of 3-thiapentyl acrylate and 3-acryloyloxy-1-methylpropane-1-sulfonic acid, sodium salt (mole ratio 1:6), prepared as described in Example 4, 52.5 g. of potassium bromide, 1.6 g. of potassium iodide and 480 ml. of water. The pH of the solution is adjusted to 6.4 with dilute aqueous sodium hydroxide and it is stirred continuously at 70° C. as a solution of 61.1 g. of silver nitrate in 320 ml. of water is added at constant rate over 30 minutes. The suspension thus formed is then cooled to room temperature.

The silver halide suspension is coagulated and redispersed as follows:

A 50-g. sample of the above suspension is treated with 8 ml. of a 4.9 percent aqueous solution of a polymer of N - (2 - amino - 2 - methylpropyl)methacrylamide, methacrylic acid salt, prepared by a procedure similar to that of Example 1. The system is stirred thoroughly and remains smoothly dispersed. It is then diluted with 74 ml. of distilled water, stirred 5 minutes and allowed to settle. A rapid clean precipitation of a slightly sticky, rubbery material occurs. The clear supernatant liquid is then conveniently decanted without loss of precipitate. Upon stirring the precipitate with enough water to bring the over-all volume back to its original level, it redisperses quickly and completely.

Similar results are obtained when coagulating aqueous dispersions of copoly[N - (3,6 - dithiaoctyl)acrylamide-3 - acryloyloxypropane - 1 - sulfonic acid, sodium salt] (1:15 molar ratio).

EXAMPLE 9

A silver halide suspension is prepared in the same manner as that in Example 8 except that the peptizer employed is a container of 3-thiapentyl acrylate and sodium methacryloyloxyethyl sulfate (mole ratio 1:6) prepared as described in Example 5.

A 50-g. sample of the above suspension is coagulated and redispersed in the same manner as that in Example 8 except that only 2 ml. of the polymer solution is employed. The behavior of this system is very similar to that in Example 8.

EXAMPLE 10

A silver halide suspension is prepared in the same manner as that in Example 8 except that the peptizer employed is a copolymer of N-(3-thiabutyl)acrylamide and 3-acryloyloxypropane-1-sulfonic acid, sodium salt (mole ratio 1:3), prepared as described in Example 6.

A 50-g. sample of the above suspension is coagulated and redispersed in the same manner as that in Example 8 except that only 4 ml. of the polymer solution is employed. The behavior of this system is very similar to that in Example 8.

EXAMPLE 11

A silver halide suspension is prepared in the following manner:

A beaker is charged with 44.8 g. of 22.3 percent aqueous solution of a copolymer of 3-thiapentyl acrylate, acrylic acid, and 3 acryloyloxypropane-1-sulfonic acid, sodium salt (mole ratio 1:1.5:5.2), prepared as described in Example 3, 65.6 g. of potassium bromide, 2.0 g. of potassium iodide and 600 ml. of water. The pH of the solution is adjusted to 6.3 with dilute aqueous sodium hydroxide, and it is stirred continuously at 70° C. as a solution of 76.4 g. of silver nitrate in 400 ml. of water is added at constant rate over 30 minutes. The suspension thus formed is then cooled to room temperature.

The silver halide suspension is coagulated and redispersed as follows:

A 50-g. sample of the above suspension is treated with 7.5 g. of a 20 percent aqueous solution of a copolymer of acrylic acid and N-vinyl-N'-(2-amino-2-methylpropyl) succinamide (mole ratio 1:1) prepared as described in Example 2. The suspension is stirred thoroughly and diluted with 67.5 ml. of water. It continues to remain smoothly dispersed. The pH is then lowered to 4 with aqueous sulfuric acid, causing a clear precipitation of a sticky, rubbery precipitate. The aqueous supernatant is then conveniently removed by decantation and replaced with 70 ml. of distilled water. Raising the pH back to its original value with stirring causes reformation of dispersion.

Although the invention has been described in considerable detail with particular reference to certain preferred embodiments thereof, variations and modifications can be effected within the spirit and scope of the invention.

We claim:

1. A method of coagulating an aqueous dispersion comprising silver halide grains and a polymeric compound which contains anionic sulfoxy groups thereon comprising the steps of (1) adding thereto a polymeric compound containing primary amine groups thereon in a concentration of at least 0.02 gram per gram of the polymeric compound containing sulfoxy groups thereon and (2) providing a dilution of said medium to at least 100 grams of liquid per gram of said polymer containing anionic sulfoxy groups thereon.

2. A method according to claim 1 comprising the additional steps of decanting the liquid from the polymeric material and redispersing the polymer in an aqueous medium.

3. A method according to claim 1 wherein said polymeric compound containing primary amine groups is a poly(vinylamine).

4. A method according to claim 1 wherein said polymeric compound containing primary amine groups is a polymer comprising units of the formula:

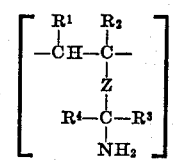

where $R^1$ is hydrogen or carboxyl; $R^2$ is hydrogen or methyl; each of $R^3$ and $R^4$ is an alkyl group of 1 to 12 carbon atoms; and Z is a divalent group containing at least one

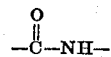

group and having the formula:

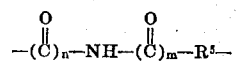

where each of $n$ and $m$ is 0 or 1, and $n$ is 0 when $m$ is 1 and $m$ is 0 when $n$ is 1, and $R^5$ is a divalent organic group consisting of alkylene of 1 to 20 carbon atoms, an oxoalkylene of 2 to 20 carbon atoms, cycloalkylene of 5 to 14 carbon atoms, and alkylenecarbamoylphenylene with the alkylene group containing 1 to 20 carbon atoms.

5. A process according to claim 1 wherein said polymeric compound containing primary amine groups is copoly(acrylic acid-N-vinyl-N'-(2-amino-2-methylpropyl) succinamide).

6. A process according to claim 1 wherein said dispersed polymer comprises sulfate groups thereon.

7. A process according to claim 1 wherein said dispersed polymer comprises sulfonate groups thereon.

8. A process according to claim 1 wherein said aqueous dispersion comprises a silver halide and said polymeric compound containing anionic sulfoxy groups thereon is a silver halide peptizer.

9. A process according to claim 1 wherein said dispersed polymer is a copolymer comprising (1) units containing sulfonate or sulfate groups thereon and (2) units containing groups thereon having at least one sulfide-sulfur atom linking two methylene groups.

10. A process according to claim 9 wherein said peptizer comprises units of 3-acryloyloxypropane-1-sulfonic acid, sodium salt.

11. A process according to claim 9 wherein said peptizer comprises units of 3-acryloyloxy-1-methylpropane sulfonic acid, sodium salt.

12. A process according to claim 9 wherein said peptizer comprises units of sodium methacryloyloxyethyl sulfate.

13. A process according to claim 9 wherein said peptizer comprises units of 3-thiapentyl acrylate.

14. A process according to claim 9 wherein said peptizer comprises units of N-(3-thiabutyl)acrylamide.

15. In a process for preparing a photographic silver halide emulsion in the presence of a silver halide peptizer which is a polymeric compound having anionic sulfoxy groups thereon, the improvement comprising a coagulation step of adding to said emulsion at least 0.02 g. to about 20 g. per gram of said polymeric compound, a second polymeric compound containing primary amine groups thereon and providing a dilution of at least 100 g. of liquid per gram of said polymeric compound having anionic sulfoxy groups thereon.

16. A process according to claim 15 wherein said amine is a poly(vinylamine).

17. A process according to claim 15 wherein said polymeric compound containing amine groups thereon is a polymer comprising units of the formula:

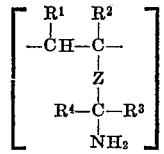

where $R^1$ is hydrogen or carboxyl; $R^2$ is hydrogen or methyl; each of $R^3$ and $R^4$ is an alkyl group of 1 to 12 carbon atoms; and Z is a divalent group containing at least one

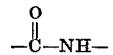

group and having the formula:

where each of $n$ and $m$ is 0 or 1, and $n$ is 0 when $m$ is 1 and $m$ is 0 when $n$ is 1, and $R^5$ is a divalent organic group consisting of alkylene of 1 to 20 carbon atoms, and oxoalkylene of 2 to 20 carbon atoms, cycloalkylene of 5 to 14 carbon atoms, and alkylenecarbamoylphenylene with the alkylene group containing 1 to 20 carbon atoms.

References Cited

UNITED STATES PATENTS

| | | | |
|---|---|---|---|
| 3,341,333 | 9/1967 | Klinger et al. | 96—114 |
| 3,411,911 | 11/1968 | Dykstra | 96—87 |
| 3,482,980 | 12/1969 | Hayakawa et al. | 96—114 |
| 3,429,708 | 2/1969 | Klinger et al. | 96—114 |

RONALD H. SMITH, Primary Examiner

U.S. Cl. X.R.

96—94 R